United States Patent [19]
Favreau

[11] 3,806,645
[45] Apr. 23, 1974

[54] INTERLACED SCANNING DEVICE FOR A TELECINE EQUIPMENT
[75] Inventor: Michel Favreau, Paris, France
[73] Assignee: Thomson-CSF, Paris, France
[22] Filed: Sept. 28, 1972
[21] Appl. No.: 293,156

[30] Foreign Application Priority Data
Oct. 15, 1971 France .................. 71.37165

[52] U.S. Cl. .................. 178/7.2, 178/DIG. 28
[51] Int. Cl. .................. H04n 5/30
[58] Field of Search ....... 178/5.2 A, DIG. 28, 5.2 D, 178/6.8, 7.2, 7.7, 5.4 CD, 6.7 A

[56] References Cited
UNITED STATES PATENTS
3,723,650  3/1973  Bradley .................. 178/DIG. 28

Primary Examiner—Richard Murray
Attorney, Agent, or Firm—Cushman, Darby & Cushman

[57] ABSTRACT

In a telecine equipment comprising a flying spot scanning tube, an interlaced scanning device comprises two optical detectors for the detection by each of them, for each frame of the film to be analysed, of an identifiable zone, such as a perforation of the film, the centres of those identifiable zones being separated on the film by a film pitch and the two optical detectors being so located as to be directed onto two points of the film separated by a distance equal to $(n \pm 1/2)$ nominal pitches of the film, where n is zero or a positive integer; each of these two optical detectors delivers for each detected one of those perforations an electric output signal which is applied through an electrical circuit to the vertical sweep generator for triggering the vertical sweeps. In another embodiment there is provided only one optical detector but the centres of the identifiable zones are spaced by half the film pitch.

3 Claims, 3 Drawing Figures

INTERLACED SCANNING DEVICE FOR A TELECINE EQUIPMENT The present invention relates to a telecine scanner device utilizing a flying spot scanner tube.

In telecine equipments utilizing scanner tubes of this kind, the tube screen is scanned in lines and fields by an electron beam which produces a moving light spot on the screen; the image of this spot scans each image of the film, and the latter's variable transparency modulates the resulting beam. Depending upon whether it is black and white or colour telecine which is involved, the beam will be directed onto one or more photomultipliers each producing a television video signal.

To obtain second-order interlacing, each of the images or frames of the film, the latter having a speed of 25 frames per second, is scanned twice in succession by two successive scanning fields.

It is then necessary to utilize either an intermittent film feed mechanism which has a very short frame masking time, less than 1.5 ms in practice, something which is extremely difficult to achieve, or a continuous film feed mechanism.

If continuous film feed is used, the frames are scanned during their passage and interlacing is effected utilizing a special optical device, with a split optical trajectory, by means of which two successive scanning fields are offset in space. The best known telecine system employing this principle comprises two identical lenses and a shutter synchronized with the field-scan function of the analyser tube, so that the tube optical trajectories can be alternately shuttered.

The field-scan operation of the scanner tube is controlled by normal sync pulses. The continuous feed of the film, achieved using synchronous motors, must be extremely uniform in order to retain accuracy in the interlacing of successive scanned fields. In practice, this accuracy essentially depends upon the stability on the part of the relative movement of film and scan, upon accuracy in the two vertically offset optical trajectories responsible for the two time-offset operations of scanning one and the same film frame, and also upon the mechanical stability of the film itself.

It is well-known, in particular, to correct the longitudinal irregularities of the film by mechanical means which adjust the axis interval between the two optical trajectories, through the displacement of one lens in relation to the other as a function of any stretching of the film; this stretching can also be measured by means of two optical detectors which detect the film perforations, in order to supply a correcting signal which electronically or mechanically controls the said axis interval. These solutions have the drawback that they require expensive and complex electrical or mechanical means.

In an interlaced scanning device, disclosed in British Patent No. 608,939, the perforations of the film are used for letting through the light rays from two light sources toward two photoelectric celles respectively, the latter thus delivering pulse trains; this device makes it possible to vary the amplitude of the vertical sweep as a function of the length of the film frames, the phase difference between the pulse trains from the two photoelectric sources being used to this end. The distance between the light beams from the two sources is so chosen that the phase difference is zero when the film has the standard length.

There is also disclosed, in French Patent Application No. 2 027 622, a scanning system in which an additional source of light and a photoelectric cell are arranged on either side of the film to generate a pulse for each frame of the film passing between those two elements. Where there is no interlacing those pulses are used for triggering the vertical sweep generator. When the output signals from the telecine system are to be conform to standards including interlacing, each pulse from the photoelectric detector is used for generating a gating signal the duration of which is adjusted for the selection, among basic pulses at twice the line frequency, the proper of pulse for triggering a vertical sweep conforming to the standard signals. This device, which has the advantage of allowing the generation of signals conform to the usual standards, no longer ensures the accurate relation between the position of the film and the scanning motion which is required for a true optical interlacing.

The present invention has for its object an interlaced scanning device which, after an initial adjustment of speed and position, makes it possible to continuously adjust the scanning to the position of the film frame being scanned, this in a direct and economical way.

According to the invention, there is provided an interlaced scanning device for a telecine equipment comprising a flying spot scanning tube, said device comprising: either one optical detector for detecting for each frame of the film to be analyzed two identifiable zones whose dimensions are smaller than those of the film frames, and the centres of which are spaced by half the film pitch or two optical detectors for the detection by each of them of one and the same identifiable zone for each frame of the film, those two optical detectors being so located as to be directed onto two points of the film to be analysed separated by a distance equal to ($n+½$) nominal pitches of the film, where $n$ is zero or a positive integer, said detector or detectors delivering for the detected identifiable zone corresponding electric output signals; and further means for applying said output signals to the vertical sweep generator of said scanning device for triggering said generator.

Other features will become apparent and the invention better understood, from a consideration of the ensuing description which is given purely by way of non-limitative example with reference to the attached drawing in which.

Figure 1:
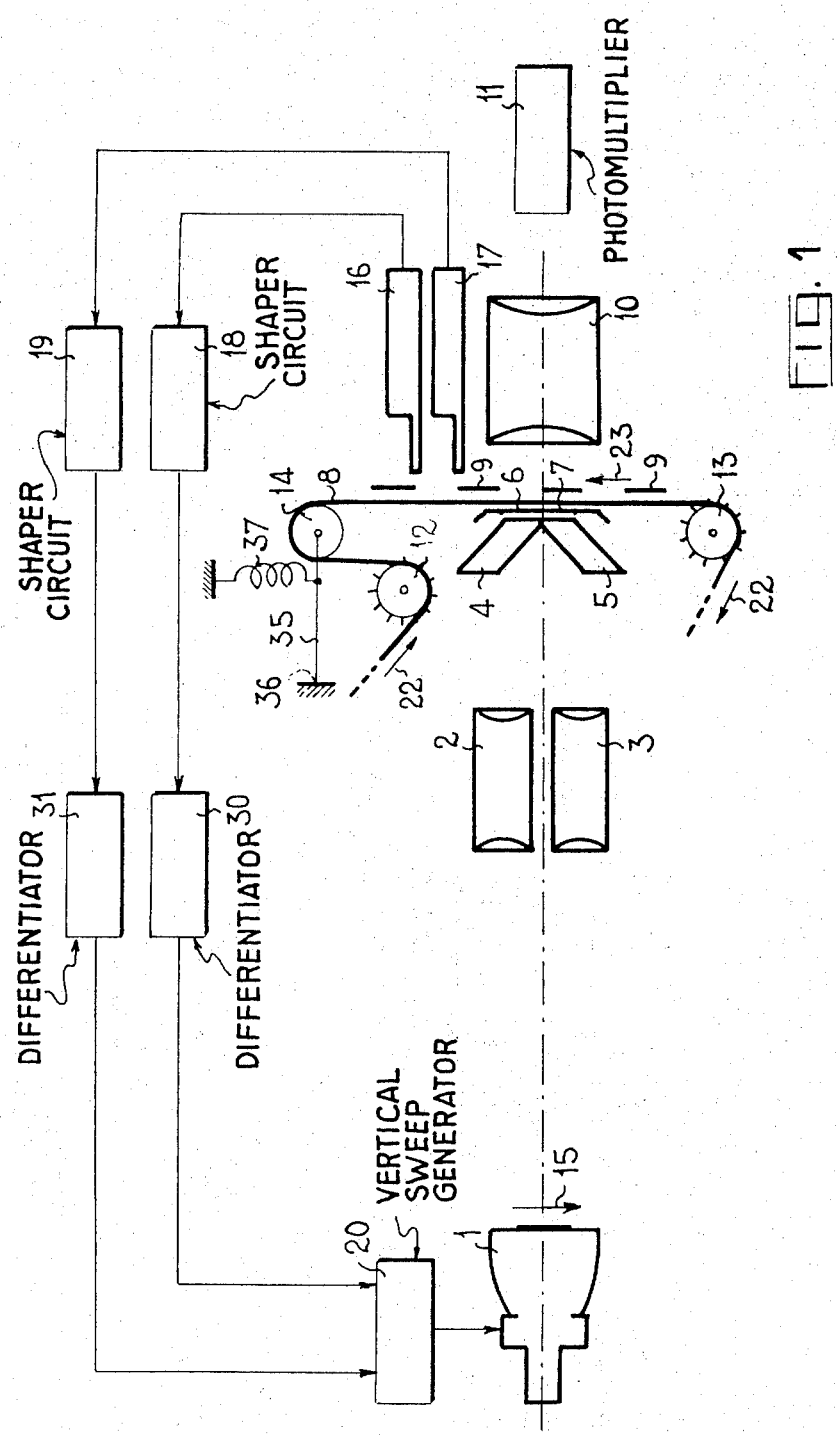
FIG. 1 is a simplified overall diagram of a telecine in accordance with the invention.

In FIG. 1, a split optical trajectory telecine system has been shown, in which continuous film feed is used. It comprises a flying spot scanner tube 1 upon the front face of which an arrow 15 indicates the vertical scanning direction; it likewise comprises a double lens, 2 and 3, associated with a double set of prisms 4 and 5, designed to set the optical axis interval to half the film pitch interval (the term "film pitch" designating the distance between the centers of two successive frames), an opaque plate in which there is cut a window 6–7 defining a scan area of the film, each half-window (6 or 7) having a height equal to half the standard pitch of the film, a film feed system constituted by the drive sprockets 12 and 13, and the smooth roller 14 with its tensioner system in the form of an articulated arm 35 pivoting about a fixed point 36 and biased by a spring 37, a shutter 9 symbolized by broken lines, a light condenser 10 and a photomultiplier 11. In the case of a colour telecine system, a trichromatic optical splitter, incorporated into a special optical condenser, and three photomultipliers, replace the condenser 10 and the photomultiplier 11.

The direction of displacement of the shutter 9 is marked by the arrow 23.

In the FIG. 1, a film 8 has likewise been shown and assumed, in this example, to be a standard 16 mm film with one perforation per frame, the film feed being in the direction of the arrows 22.

The scanning of the front face of the tube 1 corresponds alternately with the scanning of even lines and odd lines of the film frames.

When the light spot is at the top of the scan field, on the screen of the scanner tube 1, its image, given by the lens 2, is located on that part of the film which is opposite the bottom of the scanning half-window 6. As the light spot passes through the field, the image spot rises through the half-window 6. The image spot given by the other lens 3, in a similar way scans the half-window 7. The shutter 9 obturates that part of the film located opposite the half window 6, when even-numbered frame scanning is taking place, and that part opposite the half-window 7 when odd-numbered frame scanning is taking place. Because of the composition of the speeds of feed of the film 8 and of vertical scanning of the scanner tube 1, the result is that the vertical displacement of the light spot has to have a speed which is half that which corresponds to normal television field scanning.

The scanning device in accordance with the invention is based upon triggering of scanning of the scanner tube fields, by the passages of the film frames being scanned. To this end, it comprises, a fixed detector device made up, in this embodiment, of two photoelectric detectors 16, 17 arranged in proximity of the scanner window 6–7, in order to detect the marker zones which, at the rate of 1 per frame, are constituted by the perforations of the 16 mm film. The detector elements of the detector device are directed towards points on the film which are spaced apart by half a nominal film pitch, in the direction of feed of the latter, and are furthermore appropriately offset in relation to the window. The output pulses from the detector 16 are applied to a sharper circuit 18 for example a clipper amplifier. The output of the shaper circuit 18 is connected to the input of a differentiator 30 which produces a short pulse corresponding to the leading edges of the pulses applied to it. The output pulses from the detector 17 are applied to a similar circuit comprising a shaper circuit 19 and a differentiator 31. The vertical sweep generator 20 is provided with an input mixer receiving the short pulses from the differentiators 30 and 31 and directing them to the input controlling the vertical sweep.

Figure 2:
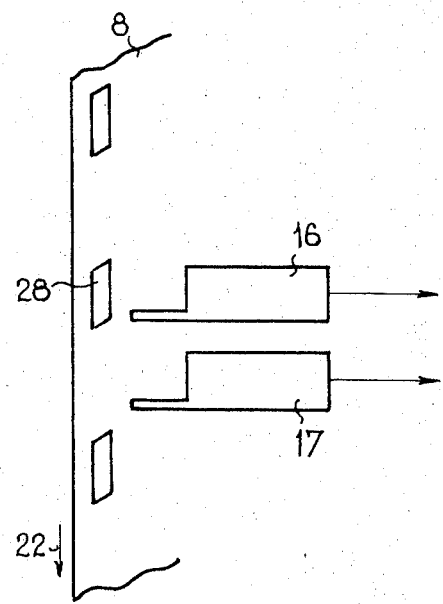
FIG. 2 is an enlarged schematic view of part of FIG. 1.

FIG. 2 again shows the optical detectors 16 and 17 and the film 8, already described in relation to FIG. 1, the light sources, situated at the other side of the film in relation to the detectors, not having been illustrated. A 16 mm film 8, seen in perspective, contains perforations such as 28 to each of which there corresponds a film frame. Thus, considering FIG. 2, the perforation 28, in passing before the photodetector 16, gives rise to a pulse which, after shaping and differentiation, initiates the triggering of vertical scanning of the even frame, by the frame generator 20; the detector 17, because of the fact that it is offset by half a pitch, not producing any pulse. When the film 8 has advanced by half a pitch in relation to the position which it occupied in FIG. 2, the detector 17 delivers a pulse while the detector 16, which is no longer confronted by a perforation, produces no output signal; this pulse, afer shaping and differentiation, initiates the triggering of vertical scanning of the odd field by the field generator 20.

The arrangement of the detectors in relation to the window is of course chosen so that the field trigger pulses substantially coincide with the proper position of the frames in the window, an electrical adjustment being provided so that the desired coincidence can be accurately set if required.

It will be observed, too, that for mechanical reasons it is impossible to arrange the detector elements of the detectors 16, 17 directly in the neighborhood of the two half-windows 6, 7 but no great error is introduced by shifting the assembly one or two film pitches in the direction of displacement of the film 8 past the condenser 10. If, for the same reasons, it should turn out to be difficult to arrange to detector elements of the detectors 16, 17 at half a film pitch from one another, this distance can be increased by a whole number $n$ of film pitches, the principle remaining equally valid as long as $n$ does not exceed more than a few units.

This principle therefore makes it possible to strictly interlock in phase and therefore in position, the scanning operations of the flying spot scanner tube 1, with the transport of the film 8. Through this direct system, in effect automatic interlacing correction is achieved since the stretching of the film is translated into terms of a larger space between two successive pulses from one and the same detector; this spacing in turn has an effect upon the time separating the start of two successive even or odd fields, depending upon whether it is the detector 16 or the detector 17 which is concerned.

It has been assumed in the foregoing that the film had only one perforation per frame. If it has a higher number $k$, for example 4 as in the case of 35 mm film, that it is merely necessary to add an element which will divide by $k$, either an optical element (rotating perforated disc) or an electronic element (K counter), arranged at a suitable point in the electrical circuit, this in effect meaning that as marker zone only one perforation in $k$ is used.

If the film possesses per frame at least two perforations spaced apart by half a pitch, it is equally possible to utilise both these perforations as marker zones, with a single detector which alternately makes it possible to trigger an even field and an odd field.

Figure 3:
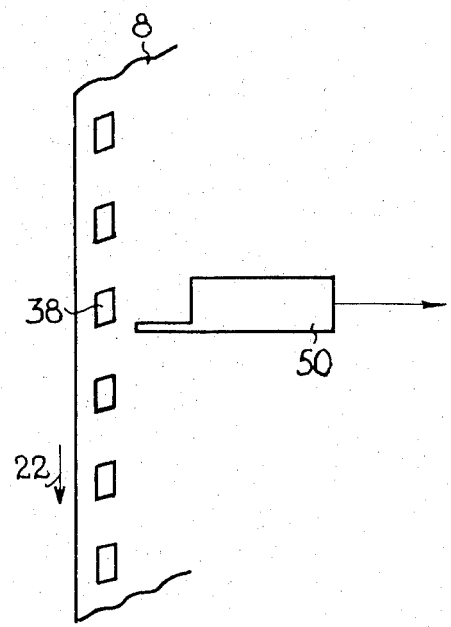
FIG. 3 illustrates another embodiment of the invention.

FIG. 3 shows a single detector 50 and a film having two perforations 38 per frame.

If the number of perforations per frame is for example 4, a single detector may still advantageously be used with a divider element reducing to 2 the number of perforations used per frame.

Of course, the invention is not limited to the embodiments described and shown which were given solely by way of example.

What is claimed is:

1. An interlaced scanning device for a telecine equipment, for the analysis of a film having frames and carrying identifiable zones the dimensions of which are smaller than those of a film frame, said zones having respective fixed locations relatively to said frames, and N of said zones being provided for each frame, said device comprising: a flying spot scanning tube; a vertical sweep generator coupled to said scanning tube; means for continuously unrolling said film; N' detectors having fixed locations, for detecting said identifiable zones and delivering pulses for the detected zones; and further means applying said pulses to said vertical sweep generator for triggering said generator; N and N' being two positive integers the product of which is equal to two, the two identifiable zones provided for each frame being separated by half the film pitch for N' = 1, and the two detectors being so located as to be directed onto two identifiable zones separated by $(n + ½)$ times said pitch, where $n$ is a non-negative integer, for N' = 2.

2. An interlaced scanning device as claimed in claim 1, wherein said identifiable zones are perforations of the film to be analysed.

3. An interlaced scanning device as claimed in claim 2, wherein said further means include means for shaping and differentiating each one of said pulses before applying them to said vertical sweep generator.

* * * * *